(No Model.) 2 Sheets—Sheet 2.

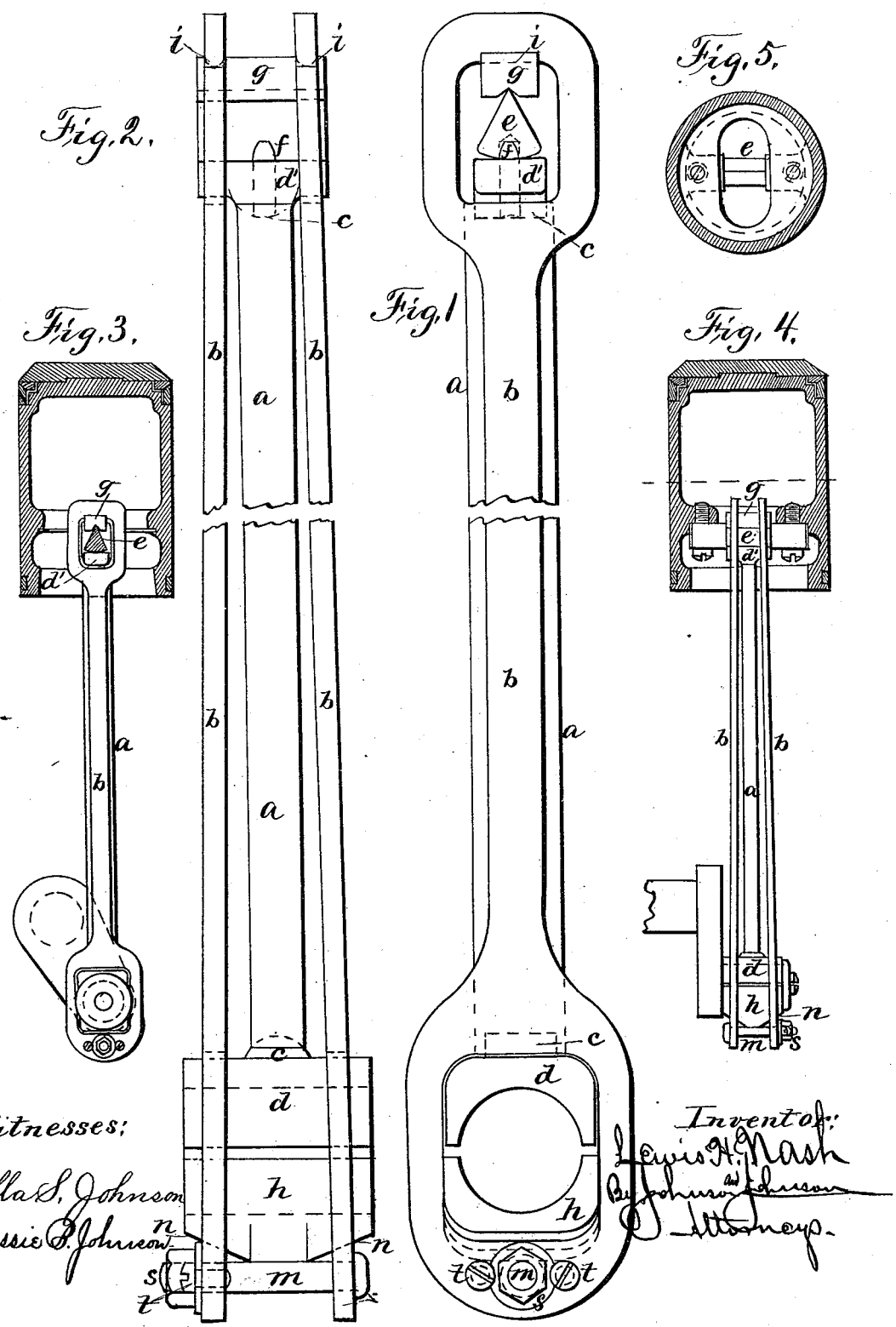

L. H. NASH.
CONNECTING ROD.

No. 379,806. Patented Mar. 20, 1888.

Witnesses:
Ella S. Johnson.
Bessie B. Johnson.

Inventor:
Lewis H. Nash
By Johnson and Johnson
Attorneys

UNITED STATES PATENT OFFICE.

LEWIS HALLOCK NASH, OF BROOKLYN, ASSIGNOR TO THE NATIONAL METER COMPANY, OF NEW YORK, N. Y.

CONNECTING-ROD.

SPECIFICATION forming part of Letters Patent No. 379,806, dated March 20, 1888.

Application filed October 6, 1886. Renewed June 21, 1887. Serial No. 242,063. (No model.)

*To all whom it may concern:*

Be it known that I, LEWIS HALLOCK NASH, a citizen of the United States, residing at Brooklyn, in the county of Kings and State of New York, have invented new and useful Improvements in Connecting-Rods, of which the following is a specification.

In a patent granted to me January 12, 1886, numbered 334,036, for bearing-pin connecting-rods I have described, shown, and claimed such a rod and its bearing-pins, having points of bearing-contact adapted to rock or to roll upon each other, as distinguished from such bearings having a sliding motion for the purpose of reducing the friction and the wear of these parts.

My present improvement is directed to the accomplishment of the same object and to provide for an automatic adjustment of the bearing-box parts, so as to bring the pressures uniformly over the bearing-surfaces of the connecting-pins.

Figure 7:
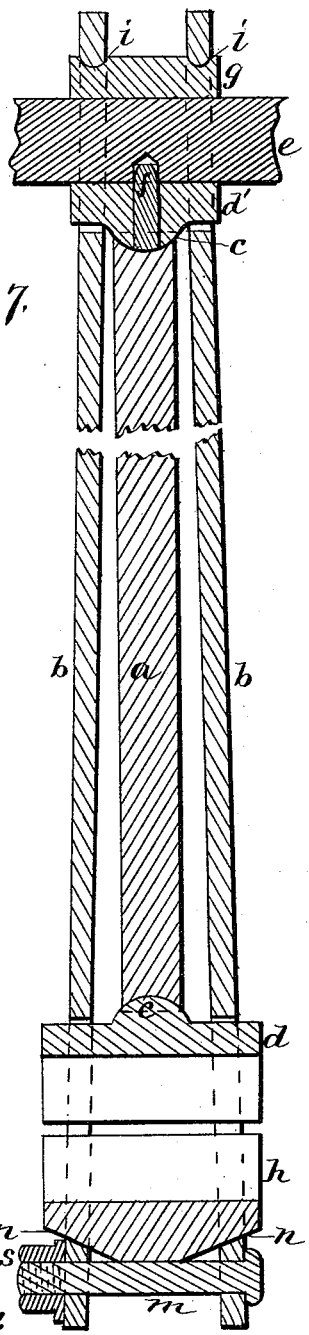
Figure 6:
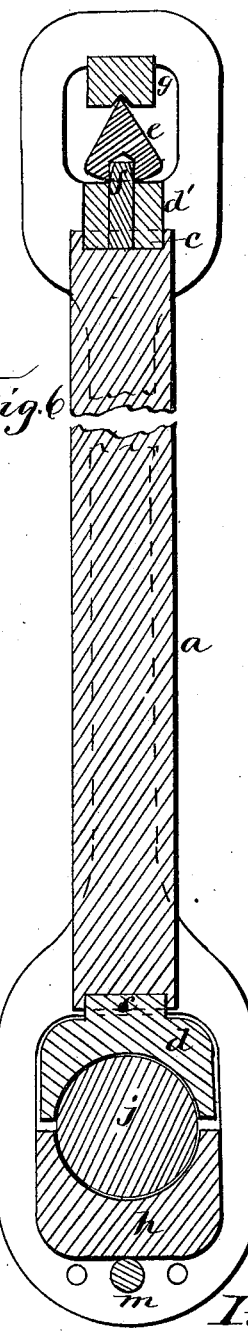

Referring to the drawings, Figure 1 represents in side view a crank-connecting rod embracing my improvements. Fig. 2 shows a similar view of another side of the rod. Figs. 3 and 4 show the rod connecting a crank and a piston. Fig. 5 shows a cross-section of the piston and its knife-edge bearing-pin in top view, and Figs. 6 and 7 are longitudinal sections of the rod enlarged.

The rod is formed of three parts, an abutment-rod, $a$, and two tie-rods, $b$, by which the bearing-box parts are secured in proper relation to and upon the abutting ends of the rod proper. In the construction shown the bearing-box parts for the piston-pin are of a knife-edge construction, while the crank-pin connecting end is adapted for cylindrical bearings. The abutment-rod $a$ is preferably of a flat oblong form in cross-section and has a socket within each end of a concave formation in the line of the width of the bar and closed at each end. Each socketed end of the rod fits over and upon a semi-cylindrical bearing, $c$, which is formed upon the inner bearing-box parts, $d$ $d'$; but the seats $c$ might be formed of separate parts. The axes of these bearings $c$ are at right angles to the axes of the bearing-pins of the crank and piston, and, while they serve as the means whereby the rod is confined from lateral displacement and maintained in proper line, they allow the bearing-box parts to adjust themselves upon the rod to the lines or positions of the bearing-pins, should the latter become out of alignment or bent, as is often the case from the pushing strains upon the rod.

The tie-rods are formed with oblong rectangular openings in each end, within which the bearing-box parts are placed and confined, so that the inner box-sections, $d$ $d'$, are free to have the self adjustment stated.

The knife-edge bearing-pin $e$ of the piston is secured by screws to a cross-web, with the knife-edge standing upward, and has its back or lower side cylindrical, the arc of which has its radius at the knife-edge. The inner face of the bearing-box part $d'$ is flat and forms a bearing-block which is free to have a rolling movement upon the cylindrical back of the knife-edge pin, as shown in Figs. 1 and 6. These two parts are kept in their proper relation to each other by a tooth, $f$, having the form of a gear-tooth, projecting from the flat bearing-surface of the box part $d'$ into a recess in the cylindrical bearing of the knife-edge pin. The outer bearing-box section $g$ has a V-shaped groove which makes bearing upon the knife-edge, while the back of this bearing-section has semicircular grooves, $i$, Fig. 7, near each end, into which the open ends of the tie-rods fit with a convex bearing, so as to have freedom to swing upon said bearing-section as upon pivots. The piston-pin connections, therefore, are formed of a knife-edge bearing having also a rolling bearing upon a box part having a cylindrical seating upon the abutment-rod.

The crank-pin bearing is formed of the usual box parts, $d$ $h$, to receive the crank-pin $j$, the back of the outer box-section $h$ being formed with inclined surfaces $n$ at each end standing from the outer side toward the crank-pin. Upon these inclined surfaces the tie-rods have their bearings, as seen in Figs. 2 and 7, and are secured to each other by a bolt, $m$, passing through openings in the ends of the tie-rods and fastened by a nut, $s$, which is locked in position by screws $t$, screwed in the side of the rod, so as to bear upon the flange of the nut, as seen in Fig. 1. The provision of the inclined bearings for the tie-rods is to take up the wear of all the parts by drawing the ends of the rods together upon the incline bearings by tightening up the nut, and in this adjustment the rods will swing upon their cylindrical bearings in the outer knife-edge bearing-box part, while the outer crank-pin bearing-box part will be forced inward by the wedge action thereon of the tie-rods, and thus bring all the bearing-surfaces to a close joining.

In the swinging movements of the rod the outer knife-edge bearing-box part will rock upon the knife-edge of the piston-pin, while the inner bearing-box part will roll upon the curved surface of the piston-pin, so that there will be no sliding movement of the bearing parts of the piston-rod connection.

When the rod is used for connecting two cranks of machinery, the bearing-box parts at both ends may be the same as shown for the crank-pin.

A key and gib may be used instead of the bolt for taking up the wear of the parts.

I claim—

1. The combination, in a connecting-rod, of an abutment-rod and bearing-box parts with separate tie-rods having openings in each end and independent bearings upon the outer box parts, and means, substantially such as described, for taking up the wear of all the parts.

2. The combination of the abutment-rod and the bearing-box parts with separate tie-rods having openings in each end, independent convex bearings upon one of the outer box parts and inclined bearings upon the other outer box part, and means, substantially such as described, for taking up the wear of all the parts.

3. The combination of the abutment-rod, the inner box-sections having cylindrical seatings upon said rod, with separate tie-rods having independent bearings upon the outer bearing-box parts, and means, substantially such as described, for taking up the wear of all the parts.

4. The combination, with the abutment-rod having socketed ends, of curved bearings seated in said sockets, the inner bearing-box sections, and separate tie-rods having independent convex bearings upon one of the outer bearing-box sections and inclined bearings upon the other outer bearing-box section, and means, substantially such as described, for taking up the wear of all the parts.

5. The combination of the rods $a\ b\ b$ and the bearing-box parts with the bolt $m$, the nut $s$, and the locking-screws, the said rods $b$ being hung upon the outer box-sections and independent of the inner box-sections, substantially as herein set forth.

6. The combination, with a connecting-rod, of a bearing therefor consisting of a bearing-pin having a knife-edge and a cylindrical bearing and bearing-box parts, one of which forms a flat bearing-block and the other has a V-shaped groove, substantially as herein set forth.

7. The combination, with the abutment-rod and the separate tie-rods, of the bearing-box parts and a bearing-pin having both a knife-edge and rolling bearings upon said box parts, substantially as herein set forth.

8. The combination, with a bearing-pin having a knife-edge and a cylindrical bearing, of an abutment-rod and the bearing-box parts, one of which has the bearing for the knife-edge and the other a flat and a cylindrical bearing, substantially as herein set forth.

9. The connecting-rod herein described, consisting of the abutment-rod $a$, its cylindrical bearing-pieces $c$, the inner bearing-box parts, the tie-rods, and the outer bearing-box parts connected to the latter, in combination with a knife-edge and a cylindrical bearing-pin, the former having a rolling bearing upon the inner box part and the latter having a tooth-connection with the rolling bearing, and means, substantially such as described, for taking up the wear of all the parts.

In testimony whereof I have hereunto set my hand in the presence of two subscribing witnesses.

LEWIS HALLOCK NASH.

Witnesses:
A. E. H. JOHNSON,
BESSIE B. JOHNSON.